United States Patent [19]

Berg et al.

[11] Patent Number: 4,587,466
[45] Date of Patent: May 6, 1986

[54] TWO AXIS LINEAR MOTOR FOR OPTICAL FOCUSING AND TRACKING SYSTEM IN OPTICAL RECORDING

[75] Inventors: Thomas E. Berg, Colorado Springs; Christopher A. Pollard, Monument, both of Colo.

[73] Assignee: Magnetic Peripherals, Minneapolis, Minn.

[21] Appl. No.: 448,130

[22] Filed: Dec. 9, 1982

[51] Int. Cl.⁴ .............................................. H02K 41/02
[52] U.S. Cl. ...................................... 318/38; 318/135; 318/115; 310/13; 310/27; 358/128
[58] Field of Search ..................................... 318/35–38, 318/135, 115; 310/12–14, 27; 358/128

[56] References Cited

U.S. PATENT DOCUMENTS

| 3,641,583 | 2/1972 | Cless et al. | 310/27 X |
| 3,745,433 | 7/1973 | Kelby, Jr. et al. | 318/115 |
| 3,771,034 | 11/1973 | Wallskog | 318/38 X |
| 3,771,035 | 11/1973 | Cless | 318/38 X |
| 3,881,139 | 4/1975 | Inaba et al. | 310/12 X |
| 4,135,206 | 1/1979 | Kleuters et al. | 358/128 |
| 4,421,997 | 12/1983 | Forys | 318/115 X |

FOREIGN PATENT DOCUMENTS

| 0002547 | 6/1979 | European Pat. Off. . |
| 57-71532 | 5/1982 | Japan . |
| 58-64648 | 4/1983 | Japan . |
| 58-64649 | 4/1983 | Japan . |
| 58-85941 | 5/1983 | Japan . |
| 58-85942 | 5/1983 | Japan . |
| 58-182137 | 10/1983 | Japan . |
| 58-182132 | 10/1983 | Japan . |
| 58-182139 | 10/1983 | Japan . |
| 58-182140 | 10/1983 | Japan . |
| 58-182141 | 10/1983 | Japan . |
| 58-194147 | 11/1983 | Japan . |
| 58-211333 | 12/1983 | Japan . |

Primary Examiner—Donovan F. Duggan
Attorney, Agent, or Firm—W. J. McGinnis; J. A. Genovese

[57] ABSTRACT

A two axis linear motor for carrying the objective lens for optical focusing and optical tracking in an optical recording system has a stationary structure for providing a magnetic field and a moving armature structure. The stationary structure may have two permanent magnets and several pole pieces to properly shape the field with respect to the armature. In one embodiment, a central elongated pole piece and two parallel adjacent elongated pole pieces which are associated with two permanent magnets to form flux gaps with the central pole piece. Flux returns to the magnets through a lower pole piece to which the central pole piece is attached. The central and lower pole pieces have an aperture through which the laser beam may pass on its way to and from the objective lens.

34 Claims, 5 Drawing Figures

TWO AXIS LINEAR MOTOR FOR OPTICAL FOCUSING AND TRACKING SYSTEM IN OPTICAL RECORDING

BACKGROUND OF THE INVENTION

The present invention relates to a two axis linear motor for carrying the objective lens in an optical head in an optical recording system of the type in which a laser beam is used to record and play back information optically from a rotating disk containing optical media.

It is well known in the art of the optical recording that an objective lens, as carried by the optical head in an optical recording device, must be moved continuously to focus the laser beam passing through an objective lens to the optical media because of continuous variations in the distance from the lens to the rotating disk as a result of mechanical wobble in the drive system. Even a very slight amount of wobble in the disk will cause the laser beam to be out of focus and, of course, correct focus is critical to this recording technique. If the laser beam is not properly focused, the beam power density will not be high enough to accomplish writing on the media.

Optical heads are known of a type in which a voice coil structure moves an armature in which an objective lens is mounted for movement towards and away from the optical media disk. The optical head is carried by an arm which provides for coarse position control. In addition, it is also known that it is desirable to have a fine position control to move the objective lens inwardly and outwardly in the radial direction with respect to the disk in order to correct minor tracking errors for the particular recording track on which it is desired to focus the objective lens. An optical read device is known in which both focusing movement and inward and outward tracking movement is achieved in the same device. This device is described in European Patent Office Publication No. 0 002 547 published on June 27, 1979. This publication shows separate coil winding and magnet structure combinations for both the tracking movements and for the focusing movements. When separate suspensions were used for tracking and focus in previous designs, unacceptable mechanical coupling existed between the two motions.

It is an object of the present invention to provide an improved two axis linear motor for use in an optical recording head for carrying an objective lens in an optical recording system.

SUMMARY OF THE INVENTION

The present invention is a two axis linear motor for carrying an objective lens in an optical head for an optical recording system. The linear motor of the present invention consists of a magnet structure which is stationary with respect to the optical head structure and an armature body structure, which moves with respect to the magnet structure, for carrying the objective lens which focuses the laser beam on the optical media. The magnet structure is elongated in the direction which will be the tracking direction of the linear motor.

The stationary magnet structure consists of two side permanent magnets with a central pole piece placed between the magnets. The central pole piece forms a structure which also has an aperture through which the laser beam may pass. The side magnets also have side pole pieces. The side magnets and side pole pieces are placed on either side of and parallel to the central pole piece structure to form two separate and complete magnetic flux circuits in which the armature is located. The side pole pieces are attached to each of the side permanent magnets and oriented with the same magnetic polarity and elongated in the tracking direction. These parallel side pole pieces form a pair of flux gaps with the central pole piece.

The armature is a structure which fits over the central pole piece and rides in the magnetic flux gaps formed between the central pole piece and the two side pole piece structures which are parallel and adjacent to the central pole piece structure. This design is such that the magnetic flux in the flux gaps is either running towards the central pole piece from both side pole piece structures or the magnetic flux is running on both sides from the central pole piece structure to the side pole piece structures. In other words, in order for the armature coils to generate the necessary motor movement, flux must either run towards the central pole piece from the side pole pieces or away from the central pole piece to the side pole pieces. However, with the coil winding structure of the preferred embodiment of the invention, magnetic flux cannot be designed to run to the central pole piece from one side and away from the other side and have the motor generate the required movements.

The armature carried two different coil winding systems. The first coil winding system consists of the focusing coil system which causes the armature to move up and down carrying the objective lens up and down in a coordinate system which brings the objective lens into and out of focus with respect to the recording media. The other coil winding system is the tracking winding system which causes the armature to move longitudinally back and forth in the direction in which the magnet structure is elongated. Both the tracking coils and the focusing coils function in the same magnet structure and the same magnetic flux gap system formed between the central pole piece structure and the two parallel side magnet and pole piece structures. The magnet structures contain high energy magnets so that comparatively high energy movements of the armature may occur using the available drive current.

The armature is carried by a suspension flexure structure which is designed to be extremely resistant to undesired motion and which is intended to be comparatively free from unwanted harmonic vibration caused by either outside disturbances which may occur in an optical recording system or by the system itself in response to drive signals. The suspension system provides for an essentially linear path of movement for the armature in the tracking and in the focus directions for deflections of the magnitude necessary to make the system operative. This characteristic is achieved because the suspension system does not have mechanically fitted pivots or other similar features which could produce mechanical variations in motion. The geometry of the system is comparatively simple which allows for a comparatively low mass in the system. Further, the mass distribution of the system can be such that undesired resonant vibration of the system is prevented both as a result of outside disturbances and as a result of excitation of the coil winding systems.

DESCRIPTION OF THE PREFERRED EMBODIMENT

Figure 1:
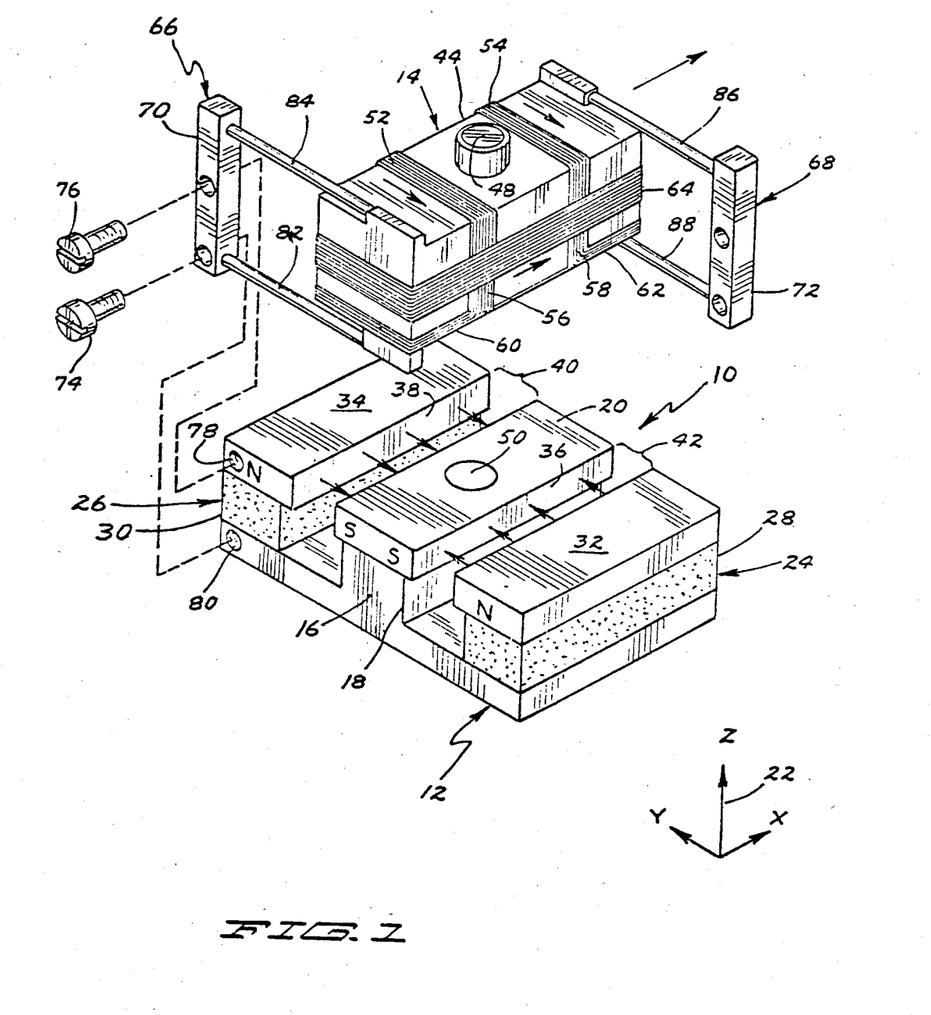
FIG. 1 shows an exploded view of a two axis linear motor according to the present invention in connection with use as an optical head in an optical recording system.

Referring now to FIG. 1, a two axis linear motor 10 according to the present invention is shown. The linear motor 10 is comprised of a magnet structure 12, generally, and an armature structure 14, generally, which fits over and around at least a part of the magnet structure. The magnet structure 12 forms a dual magnetic circuit by means of two permanent magnets 24 and 26 acting through two upper pole pieces, 32 and 34, which are of the same magnetic polarity, and a single lower pole piece 16 to which is attached a central pole piece 20 which the armature structure 14 surrounds. A magnetic flux gap is defined between the central pole piece 20 and each of the upper pole pieces, 32 and 34, with magnetic flux lines crossing these gaps in opposite directions, i.e. toward the central pole piece on both sides or away from the central pole piece on both sides, as indicated by the polarity markings and arrows in FIG. 1. This gap and the field which its orientation prescribes are used for movement of the armature 14 as will be explained.

The coordinate reference system on which this description is based is shown at 22 in which the Z axis represents the focusing axis with respect to a recording media, the X axis represents a radial tracking axis with respect to moving from one recording track to another on the media while the Y axis is tangential to a data track on the recording media.

The magnet structure 12 is elongated in the X axis direction which represents the radial inward and outward track selection direction with respect to the recording media. Pole piece 32 has an inward edge which forms a parallel planar face adjacent to an edge 36 of pole piece 20. Pole piece 34 has an inward edge 38 which forms an elongated planar gap with an adjacent, outer facing edge of pole piece 20. The gap between pole piece 34 and pole piece 20 shall be referred to as flux gap 40 and the gap between the central pole piece 20 and pole piece 32 shall be referred to as flux gap 42.

The armature 14 has a body structure 44 having an aperture for mounting an objective lens assembly 48 which fits over and around the central pole piece 20. The objective lens assembly 48 is fixed over an aperture 50 which passes through pole piece 20 so that the laser beam of the optical recording system can pass through to the objective lens assembly 48. The armature body structure 44 carries a pair of tracking coil windings 52 and 54 relatively displaced towards either end thereof and which are connected in series electrically.

Because of the pole piece 16, the tracking coil windings 52 and 54 cannot go entirely around the armature body 44, in this embodiment of the invention. Thus, each tracking coil winding must consist of a first portion 56 and 58 associated with windings 52 and 54, respectively, which cut the magnetic lines of flux in gaps 40 and 42 and a second portion 60 and 62 associated with coils 52 and 54, respectively, for completing the electric circuit and which go around the ends of the armature body in the X-Y plane and away from the magnetic flux gaps 40 and 42. The embodiment of the invention shown in FIGS. 2, 3 and 5 have these coils going entirely around the armature.

A single focus coil winding 64 passes completely around the armature body 44 in the X-Y plane to provide the focus motion of the linear motor. The focus coil winding 64 is positioned so as to ride in magnetic flux gaps 40 and 42.

The armature body is supported by a pair of suspension flexures 66 and 68. The suspension flexures are opposed parallelogram structures which constrain the center of the armature structure 14 to move along a straight line path in the X axis and in the Z axis, for small deflections and not at all in the Y axis. The ends of the armature may not move in a straight line mode to the same extent as the center of the armature, but it is the center of the armature where the lens is located which is critical. The suspension flexures 66 and 68 provide restoring forces to return the armature to the approximate center of its travel when no drive currents are present in the tracking coil windings or the focus coil winding. As the armature moves to the extremes of its travel, the radius from the flexure attachment points remains constant, causing a very slight rotation of the armature body 44 about the central Z axis.

Each suspension flexure has a magnet mounting piece 70 and 72 associated with flexure 66 and flexure 68, respectively. The mounting piece 70 and the mounting piece 72 may be fixed to the magnet structure by any appropriate fastening means such as screws 74 and 76 which may pass through the mounting piece 70 and into holes 78 and 80, respectively, in magnet element 26.

The flexures 66 and 68 have flexure elements extending from the mounting pieces 70 and 72 to the armature. In the particular application shown herein, a pair of parallel wire elements 82 and 84 extend from mounting piece 70 to be supported on the armature body 44. Similarly, flexure 68 has flexure parallel wire elements 86 and 88 extending from mounting piece 72 towards the armature body and which is fixed to the armature body. These wire elements may be a wire or a spring wire such as music instrument wire. These wire elements may also be used to carry driving currents to the focus and tracking motor windings. The four wire elements, as shown in this embodiment of the invention, 82, 84, 86 and 88 control the movement of the armature body 44 allowing only X and Z translation of the armature body with respect to the magnet structure. The structure allows only extremely small rotations about the Z axis. One undesirable movement is possible, a comparatively small amount of pitch (i.e. rotation about the Y axis of the armature) in the longitudinal direction which is seen in the X-Z plane. This X-Z plane pitch, however, is limited by the comparatively small dimensions involved in the structure as well as the stiffness of the wire elements 82, 84, 86 and 88.

By way of example, magnets 24 and 26 may be selected to be magnets 28 and 30 having extremely high energy, approximately 18 megagauss-oersted, in the first embodiment. Eighteen megagauss-oersted is the energy product of one type of magnet, and that product is achieved at one point of the demagnetizing curve which represents an optimized operating condition for that magnet, that is, the correct width of flux gap, length of magnet, area and volume of magnet, flux concentration techniques, etc. That does not necessarily mean that the magnet achieves that energy in any particular application. This energy product is the maximum product of the value of the magnetizing force and residual induction from the demagnetizing curve of such a magnet. This value is indicative of the energy that each cubic unit of magnet material can supply for external use. In effect, this means that a coil with a given amount of current in the force field of such a magnet can produce more energy than if a magnet having a lower external energy were used. Magnets having this value of external energy may be ceramic, rare earth, iron-cobalt magnets. Such magnets are commercially available.

With reference to a particular embodiment according to FIG. 1, the armature body 44 will typically move back and forth approximately 0.3 mm from a central position in the tracking direction and approximately 0.7 mm up and down from a central position in the focusing direction. Magnetic gaps 40 and 42 may be approximately 1 mm in width. The focusing coil may be approximately 35 to 40 turns of No. 36 wire. Tracking coils 52 and 54 may each be approximately 20 to 25 turns of No. 36 wire. The armature body 44 may be approximately 7 mm to 8 mm in width, the Y coordinate axis, and 16 mm to 18 mm in length, the X or tracking coordinate axis. The armature body may weigh approximately 2 grams. The wires 82, 84, 86 and 88 may be a music instrument wire and may be 303 stainless steel.

Figures 2, 4:
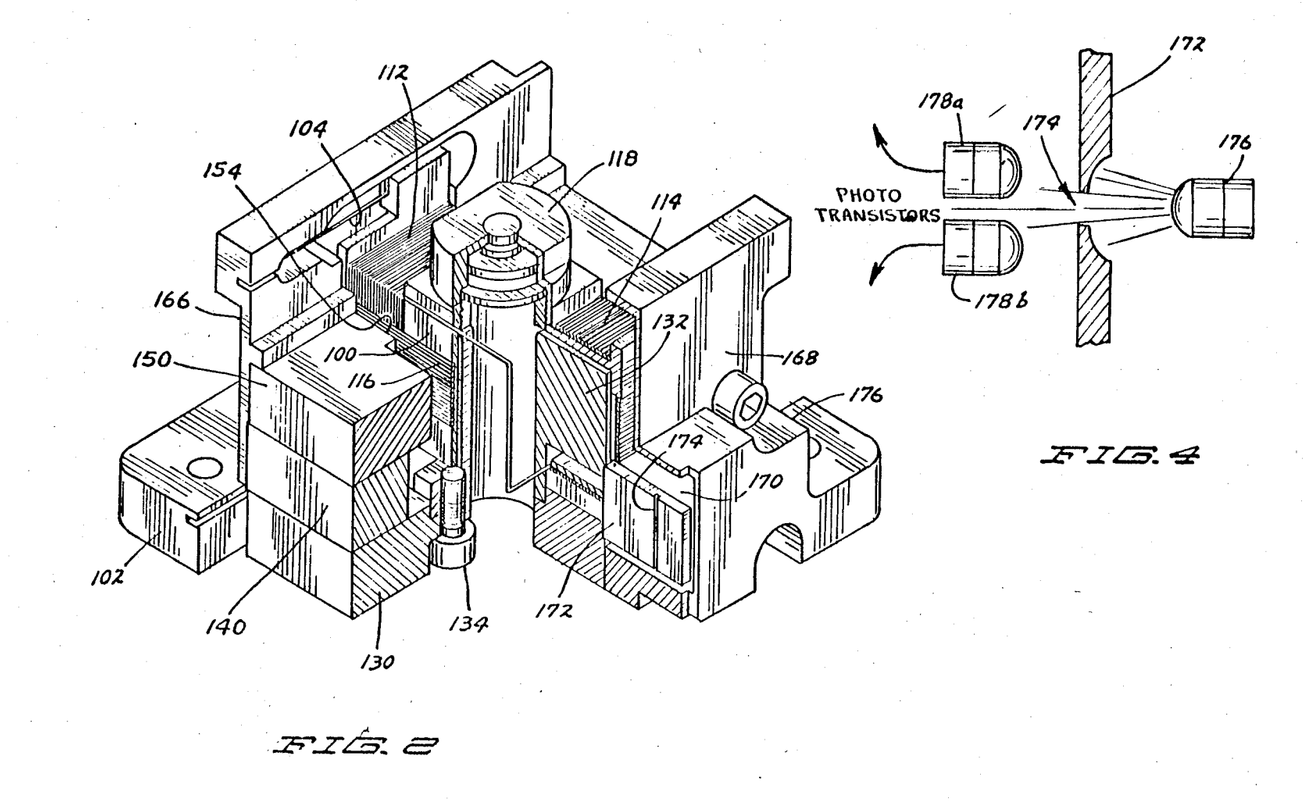
FIG. 2 shows another embodiment of the two axis linear motor according to the present invention.
FIG. 4 shows a detail of the linear motor of FIGS. 2 and 3.
Figure 3:
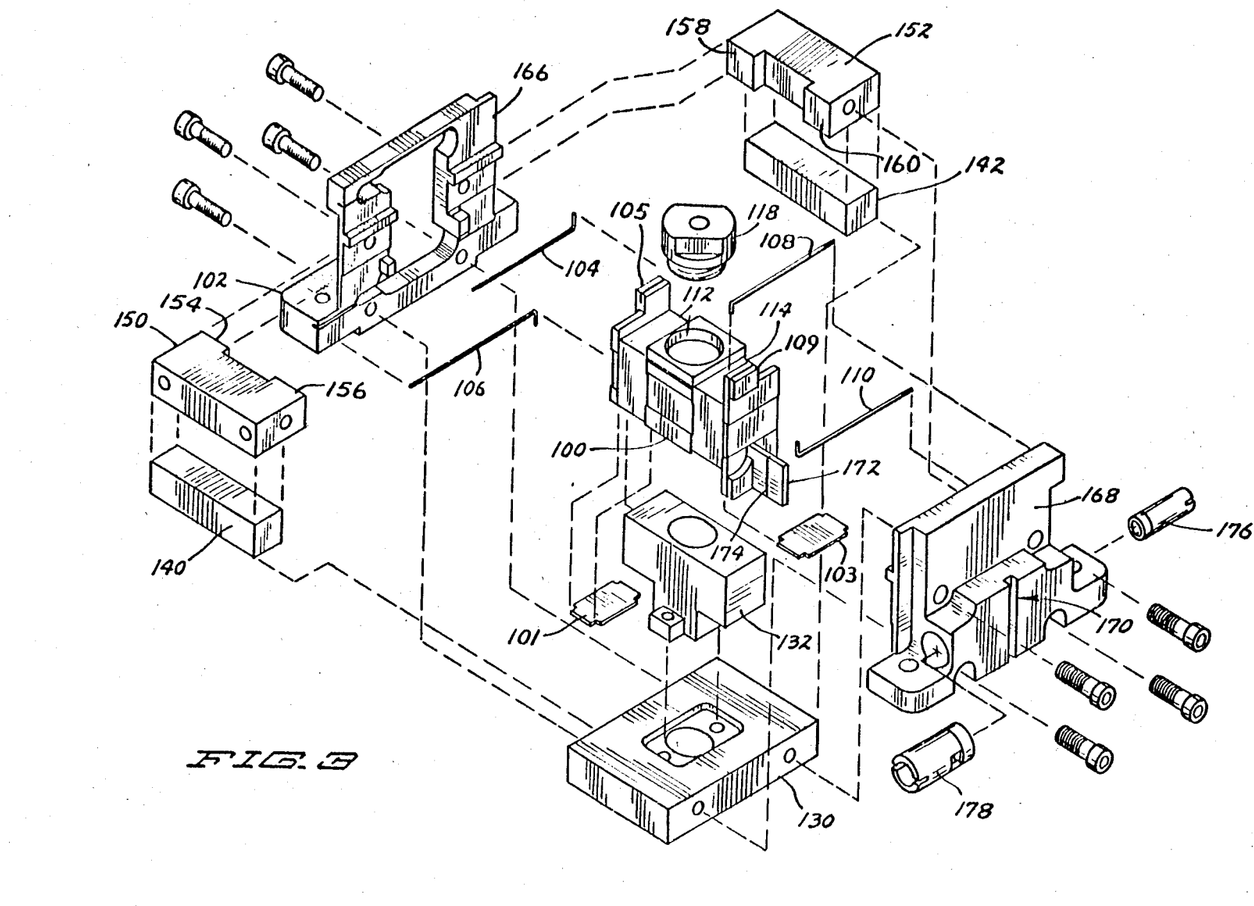
FIG. 3 shows an exploded view of the embodiment of the two axis linear motor according to the present invention as shown in FIG. 2.

Referring now to FIGS. 2 and 3, which are assembled and exploded views, respectively, of another embodiment of the invention, a linear motor according to the present invention consists of a moving armature 100 and a stationary magnet and pole piece assembly 102. The armature is a shell structure which has an essentially hollow inner cavity. The armature is supported by suspension wires 104, 106, 108, and 110. The armature has mounting posts 105 and 109 to connect with and hold wires 104 and 108, respectively. Similar mounting posts, not shown, are used for wires 106 and 110. Mounting posts 105 and 109 clamp the suspension wires firmly so that they do not pivot or swivel at the post and so that movement is controlled solely by bending of the wire. The armature has coils 112 and 114 corresponding to coils 52 and 54 in the embodiment shown in FIG. 1. The armature has a focus coil 116 corresponding to coil 64 shown in the embodiment of FIG. 1. The armature supports a lens assembly 118. The details of the lens assembly are not critical to this application, but are of course appropriate to the optical system for optical recording.

The stationary assembly has a lower pole piece 130 which forms a base for the structure. Secured to the lower pole piece 130 is an inner pole piece 132 which is actually contained within the armature assembly and which must be inserted into the armature assembly in order to wind coils 112 and 114. This inner pole piece 132 is secured to the lower pole piece 130 using screws 134. In assembling the inner pole piece 132 into the hollow cavity of the armature 100, coil winding plates 101 and 103 are fitted into the bottom of the armature to hold the pole piece 132 and to prevent the armature from collapsing as the coils are wound. In this embodiment the coils are wound after the foregoing mechanical assembly.

Mounted to the lower pole piece 130 are side magnets 140 and 142 which function in much the same manner as the magnets described in connection with the embodiment of FIG. 1.

Supported on top of magnets 140 and 142 are upper pole pieces 150 and 152 which have faces 154, 156, 158 and 160, respectively, for forming flux gaps through the coils on the armature and to the inner pole piece 132. Faces 154, 156, 158 and 160 project closer to the inner pole piece than the rest of the respective upper pole pieces to form narrower flux gaps for coils 112 and 114 and to concentrate the magnetuc flux at the ends of the armature so that the greatest force is exerted at the ends of the armature and not in the middle. By exerting moving forces at the ends of the armature, better control of movement is achieved and less tendency to undesired motion results.

The magnet and pole piece structures are held in place and supported by front support 166 and rear support 168, respectively. It should be noted that rear support 168 has a slot 170 formed therein. This is so that a flag 172, which is carried by armature 100, may ride in the slot. The flag has a very small slot 174 with an opening formed therein for the passage of light. Light is projected by a light element 176 through slot 174 to a photo transistor holder or light receiver 178. The operation of this mechanism is to detect movement of the armature as indicated by the flag moving slot 174 back and forth in the light beam created by the light element 176.

This embodiment of the invention has the advantage over the embodiment shown in FIG. 1 that coils 112 and 114 on the armature body pass entirely around the armature body without having to take a detour around the end of the armature body as shown in FIG. 1. However, this embodiment of the invention does require that the inner pole piece 132 be permanently captured by the coil structure and that the armature and inner pole piece structure will be forever secured together. This embodiment may be most desirable for most commercial applications of the present invention. However, it is also possible that the embodiment of the invention shown in FIG. 1 may also be seen to be desirable in some situations.

FIG. 4 is a detail of FIGS. 3 and 4 showing the light element 176 projecting light through slot 174 in flag 172 to a pair of light detectors 178a and 178b to determine flag motion. The difference in current produced by detectors 178a and 178b is representative of changes in light intensity caused by movement of flag 172. Thus, the differential current from the detectors can be used to show the direction and amount of movement of the armature.

Figure 5:
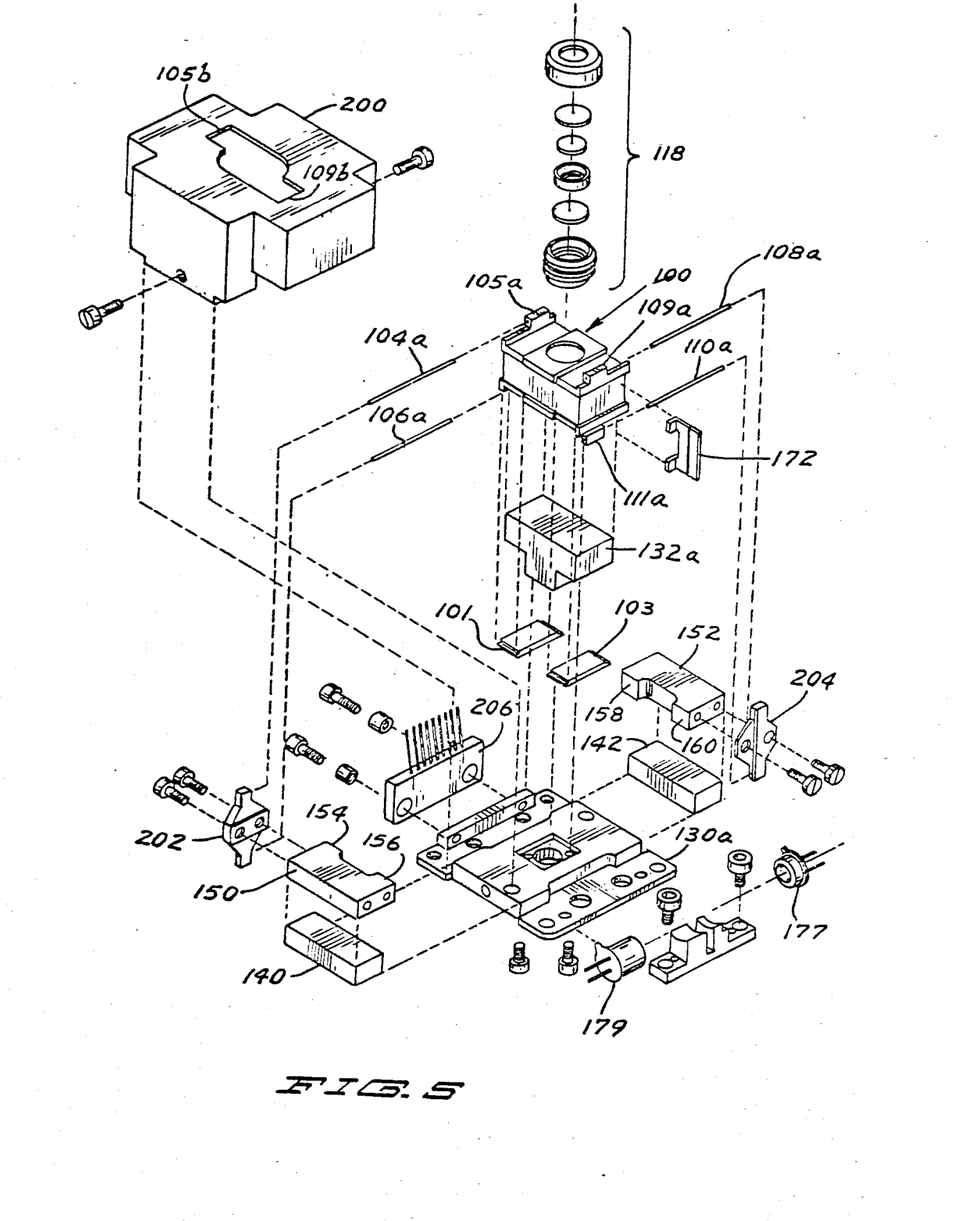
FIG. 5 shows an exploded view of a further embodiment of the two axis linear motor according to the present invention.

Referring now to FIG. 5, another embodiment of the present invention is shown. This embodiment is closely related to the embodiment shown in FIGS. 2, 3 and 4 and so therefore some of the parts or elements are identical. In describing the embodiment of FIG. 5, identical parts and elements have identical numbers as used in describing the embodiment of FIGS. 2, 3 and 4. Parts that are essentially similar and have essentially the same function but with minor differences of structure use an element number followed by a letter. Parts and elements that are totally different have totally different numbers. The essential difference of the embodiment of FIG. 5 from the other embodiments is in the mechanical packaging in which an outer cover structure 200 is used to mechanically hold and secure the other elements of the linear motor according to the present invention to a base plate and lower magnetic pole piece element 130a. As shown in FIG. 5, and a comparison may be made with FIG. 3 the lower pole piece and base plate element 130a forms a similar function in assembling the linear motor but has a different configuration for the embodiment of FIG. 5 so that it may mate with the cover element 200.

The armature 100 of the present embodiment is essentially identical to the armature of the embodiment as shown in FIG. 4. However, the mounting posts 105a and 109a are slightly different in order to secure the supporting flexure elements 104a, 106a, 108a and 110a. As may best be seen in FIG. 3, wire elements 104, 106, 108 and 110 have a curved end portion which is used to secure the wire elements in the mounting posts 105 and 109. In the embodiment of the invention shown in FIG. 5, the wire elements 104a, 106a, 108a and 110a are straight and are inserted into a hole which is made in the mounting posts 105a, 109a and 111a. Wire element 106a fits into a mounting post, also, not shown.

Inner pole piece 132a performs essentially the same function in the same fashion as inner pole piece 130 as shown in FIG. 3. Inner pole piece 132a as shown in FIG. 5 is formed in a slightly different fashion however for mounting to base plate and pole piece 130a. Magnets 140 and 142 as well as pole pieces 150 and 152 are identical to the pole pieces of the embodiment shown in FIGS. 2, 3 and 4.

Cover 200 is mounted to lower base plate and pole piece 130a using screws mounted through the sides of the cover and into the sides of plate 130a. Magnets 140 and 142 and pole pieces 150 and 152 are assembled on top of plate 130a. Flexure support elements 202 and 204 are mounted to pole pieces 150 and 152 using screws as shown. Flexure support elements 202 and 204 support suspension wire elements 104a, 106a, 108a and 110a which in turn, together, support armature 100. Terminal plate 206 is mounted to plate 130a and serves as a termination for the wires from the coil windings. When assembled, mounting posts 105a and 109a on armature 100 project into and ride back and forth in slots 105a and 109b in cover 200. It is intended that the armature and the mounting posts do not touch cover 200 at the edges of these slots, but the slots provide a guide and a limit to the extremes of travel of the armature in order to protect the structure. This embodiment of the invention has the advantage that mechanical assembly of the compliments is comparatively easy and the cover structure 200 is used to maximum advantage as a structural element of the assembly and to protect the linear motor from external mechanical damage. In addition, the cover may also be used to protect the linear motor from stray electrical or magnetic fields as well as containing all electrical and magnetic fields created by the linear motor and preventing them from radiating externally.

It is intended that the natural resonant frequency of vibration of the armature body in connection with the suspension flexure system be a comparatively low frequency so that it is below any frequency naturally occurring in an optical recording system. Because an optical recording system may be subject to vibration as low as 60 Hz because of power transformers operating on the United States power line frequency, or the 50 Hz power line frequency common in other countries, it is desired that this system have a natural resonant frequency less than 50 Hz and in the 30 to 50 Hz region.

What is claimed is:

1. A two axis linear motor comprising:
   a magnet structure having at least two high energy permanent magnets and an elongated central pole piece and a pair of elongated side pole pieces disposed parallel and adjacent to said central pole piece in the elongated direction to create a pair of magnetic flux gaps with respect to said central magnet pole piece,
   an armature structure adapted to fit over and around said central pole piece, said armature structure having a first coil winding means disposed in a first coordinate reference plane in said pair of magnetic flux gaps and a second coil winding means in a second and different coordinate reference plane in said pair of magnetic flux gaps, and
   a suspension flexure structure means for mounting said armature structure to said magnet structure for movement in two directions, the first direction perpendicular to said first coordinate reference plane and the second direction perpendicular to said second reference plane, said suspension flexure structure means supporting said armature structure against undesired rotations and translations while allowing the first and second movements with respect to said magnet structure.

2. The structure of claim 1 wherein said suspension flexure structure is a pair of opposed parallelogram suspension flexures in which a first parallelogram suspension flexure has two parallel wire elements supporting one end of said armature from one side of said central pole piece and a second parallelogram suspension flexure has two parallel wire elements supporting the other end of said armature from the other side of said central pole piece.

3. The structure of claim 1 wherein said armature structure first coil winding means is a pair of tracking coil windings each having a first portion disposed in said first coordinate reference plane in said magnetic flux gaps and a second portion which returns in a different reference plane outside the magnetic flux gaps.

4. The structure of claim 1 wherein the central pole piece of said magnet structure has an aperture and said armature has a means for mounting an objective lens over said aperture.

5. The structure of claim 1 wherein each of said elongated side pole pieces is formed with a pair of faces projecting closer to the central pole piece at the ends of the side pole piece and so that the ends of the armature are within the narrower flux gap formed by said faces in conjunction with said central pole piece so that the greatest moving force is exerted at the ends of the armature to better control armature movement and to limit undesired armature movement.

6. The structure of claim 1 wherein said armature structure is formed with a pair of top mounting posts adapted for connection with said flexure structure means and further comprising a cover structure adapted to mechanically secure the linear motor and for connection with said central pole piece, said cover structure including at least a pair of slot elements adapted to conform to said armature mounting posts and to limit the extreme limits of travel of said armature by means of said slots disposed adjacent the path of travel of said mounting posts.

7. The suspension flexure structure means of claim 1 having a natural frequency of vibration below 50 Hz.

8. A two axis linear motor comprising:
   a lower magnetic pole piece forming a base structure,
   a pair of side magnets mounted one on each side of said lower pole piece,
   a pair of upper pole pieces mounted one on each side magnet, an inner central pole piece mounted to said lower magnetic pole piece and spaced apart from each of the upper pole pieces to form magnetic flux gaps with the inner central pole piece and each upper pole piece, an armature for carrying a lens assembly, a first coil winding on said armature operative when current is passed therethrough to generate focusing motion of said armature, a second and third coil windings on said armature orthogonal to said first coil winding operative when current is passed therethrough to generate tracking motion of said armature, mounting means for mounting said armature in to be disposed over and around said central inner pole piece and position said first, second and third coils the flux gaps between the upper side pole pieces and the central inner pole pieces.

9. The linear motor of claim 8 wherein each of the upper side pole pieces is formed with a pair of faces to be closer to the central inner pole piece at the ends thereof so as to concentrate magnetic flux.

10. The linear motor of claim 8 wherein said linear motor has an aperture for the passage of light through said inner pole piece and said armature carries a lens assembly over said aperture.

11. The linear motor of claim 8 wherein said armature carries a flag in relationship to a stationary portion of said motor and further comprising a light assembly and a light detecting means disposed with respect to said flag so that movement of said flag causes a variation of light received by said light detecting means to monitor movement of said armature.

12. The structure of claim 8 wherein each of said elongated side pole pieces is formed with a pair of faces projecting closer to the central pole piece at the ends of the side pole piece and so that the ends of the armature are within the narrower flux gap formed by said faces in conjunction with said central pole piece so that the greatest moving force is exerted at the ends of the armature to better control armature movement and to limit undesired armature movement.

13. The structure of claim 8 wherein said armature structure is formed with a pair of top mounting posts adapted for connection with said flexure structure means and further comprising a cover structure adapted to mechanically secure the linear motor and for connection with said central pole piece, said cover structure including at least a pair of slot elements adapted to conform to said armature mounting posts and to limit the extreme limits of travel of said armature by means of said slots disposed adjacent the path of travel of said mounting posts.

14. A linear motor for operation on two orthogonal axes, comprising:
a stationary magnet and pole piece structure for generating a magnetic field between a pair of magnetic flux gaps, including a center inner structure and a surrounding outer structure, having a pair of upper elements one of which is disposed adjacent to each side of the inner center piece and defining the magnetic flux gaps as part of a complete magnetic circuit including the inner center piece and the outer structure, an armature disposed around said inner center structure and within said flux gaps, a first coil means supported by said armature for causing movement in a first direction, a second coil means supported by said armature for causing movement in a second direction orthogonal to the first direction, said first and second coil means being supported by said armature within said flux gaps formed by said stationary magnet and pole piece structure, a flexure support means for said armature for supporting said armature within said flux gaps for linear motion in said first and second directions and for restraining other movements of said armature, said flexure support means comprised of first and second support wires extending from said stationary structure to one end of said armature and forming a parallelogram structure orthogonal to said first and second directions and third and fourth support wires extending from said stationary structure to the other end of said armature and forming a parallelogram structure orthogonal to said first and second directions.

15. The structure of claim 14 wherein said flexure support means is a pair of opposed parallelogram suspension flexures in which a first parallelogram suspension flexure has two parallel wire elements supporting one end of said armature from one side of said central inner piece and a second parallelogram suspension flexure has two parallel wire elements supporting the other end of said armature from the other side of said central inner piece.

16. The structure of claim 14 wherein said armature structure first coil winding means is a pair of tracking coil windings each having a first portion disposed in a first coordinate reference plane in said magnetic flux gaps orthogonal to the tracking direction and a second portion which is in a different reference plane outside the magnetic flux gaps.

17. The structure of claim 14 wherein the central inner piece of said stationary magnet structure has an aperture and said armature has a means for mounting an objective lens over said aperture.

18. The flexure support means of claim 14 having a natural frequency of vibration below 50 Hz.

19. The structure of claim 14 wherein each of said elongated side pole pieces is formed with a pair of faces projecting closer to the central pole piece at the ends of the side pole piece and so that the ends of the armature are within the narrower flux gap formed by said faces in conjunction with said central pole piece so that the greatest moving force is exerted at the ends of the armature to better control armature movement and to limit undesired armature movement.

20. The structure of claim 14 wherein said armature structure is formed with a pair of top mounting posts adapted for connection with said flexure structure means and further comprising a cover structure adapted to mechanically secure the linear motor and for connection with said central pole piece, said cover structure including at least a pair of slot elements adapted to conform to said armature mounting posts and to limit the extreme limits of travel of said armature by means of said slots disposed adjacent the path of travel of said mounting posts.

21. A two axis linear motor comprising:
a magnet structure having at least two high energy permanent magnets and an inner pole piece means and a pair of side pole piece means disposed adjacent to said inner pole piece means to create a pair of spaced-apart magnetic flux gaps with respect to said inner pole piece means, an armature structure adapted to fit over and around said inner pole piece means, said armature structure having a first coil winding means disposed in a first coordinate reference plane in said pair of magnetic flux gaps and a second coil winding means in a second and different coordinate reference plane in said pair of magnetic flux gaps, and a suspension flexure structure means for mounting said armature structure to said magnet structure for movement in two directions, the first direction perpendicular to said first coordinate reference plane and the second direction perpendicular to said second reference plane, said suspension flexure structure means supporting said armature structure against undesired rotations and translations while allowing the first and second movements with respect to said magnet structure.

22. The structure of claim 21 wherein said suspension flexure structure is a pair of opposed parallelogram suspension flexures in which a first parallelogram suspension flexure has two parallel elements supporting one end of said armature from one side of said inner pole piece means and a second parallelogram suspension flexure has two parallel elements supporting the other end of said armature from the other side of said inner pole piece means.

23. The structure of claim 21 wherein said armature structure first coil winding means is a pair of tracking coil windings each having a first portion disposed in said first coordinate reference plane in said magnetic flux gaps and a second portion which returns in a different reference plane outside the magnetic flux gaps.

24. The structure of claim 21 wherein said inner pole piece means of said magnet structure has an opening and said armature has a means for mounting an objective lens over said opening.

25. The structure of claim 21 wherein each of said side pole pieces is formed with a pair of faces projecting closer to the inner pole piece means at the ends of said side pole piece means and so that the ends of the armature are within the narrower flux gap formed by said faces in conjunction with said inner pole piece means so that the greatest movement force is exerted at the ends of the armature to better control armature movement and to limit undesired armature movement.

26. The structure of claim 21 wherein said armature structure is formed with a pair of top mounting posts adapted for connection with said flexure structure means and further comprising a cover structure adapted to mechanically secure the linear motor and for connection with said inner pole piece means, said cover structure including at least a pair of slot elements adapted to conform to said armature mounting posts and to limit the extreme limits of travel of said armature by means of said slots disposed adjacent the path of travel of said mounting posts.

27. The suspension flexure structure means of claim 21 having a natural frequency of vibration below 50 Hz.

28. A linear motor for operation on two orthogonal axes, comprising:

a stationary magnet and pole piece structure for generating a magnetic field between a pair of magnetic flux gaps, including an inner pole piece means and a surrounding outer pole piece means, said structure defining a pair of magnetic flux gaps, each flux gap being part of a complete magnetic circuit including the inner pole piece means and the outer pole piece means, an armature disposed around said inner pole piece means and within said magnetic flux gaps, a first coil means supported by said armature for causing movement in a first direction, a second coil means supported by said armature for causing movement in a second direction orthogonal to the first direction, said first and second coil means being supported by said armature within said flux gaps, a flexure support means for said armature for supporting said armature within said flux gaps for linear motion in said first and second directions and for restraining other movements of said armature, said flexure support means comprised of first and second support members extending from said stationary structure to one end of said armature and forming a parallelogram structure orthogonal to said first and second directions and third and fourth support members extending from said stationary structure to the other end of said armature and forming a parallelogram structure orthogonal to said first and second directions.

29. The structure of claim 28 wherein said flexure support means is a pair of opposed parallelogram suspension flexures in which a first parallelogram suspension flexure has two parallel members supporting one end of said armature from one side of said inner pole piece means and a second parallelogram suspension flexure has two parallel members supporting the other end of said armature from the other side of said inner pole piece means.

30. The structure of claim 28 wherein said armature structure first coil winding means is a pair of tracking coil windings each having a first portion disposed in a first coordinate reference plane in said magnetic flux gaps orthogonal to the tracking direction and a second portion which is in a different reference plane outside the magnetic flux gaps.

31. The structure of claim 28 wherein the inner pole piece means of said stationary magnet structure has an opening for light travel and said armature has a means for mounting an objective lens over said opening.

32. The flexure support means of claim 28 having a natural frequency of vibration below 50 Hz.

33. The structure of claim 28 wherein each of said side pole piece means is formed with a pair of faces projecting closer to the inner pole piece means at the ends of the side pole piece means so that the ends of the armature are within the narrower flux gap formed by said faces in conjunction with said inner pole piece means so that the greatest moving force is exerted at the ends of the armature to better control armature movement and to limit undesired armature movement.

34. The structure of claim 28 wherein said armature structure is formed with a pair of top mounting posts adapted for connection with said flexure structure means and further comprising a cover structure adapted to mechanically secure the linear motor and for connection with said inner pole piece means, said cover structure including at least a pair of slot elements adapted to conform to said armature mounting posts and to limit the extreme limits of travel of said armature by means of said slots disposed adjacent the path of travel of said mounting posts.

* * * * *